July 27, 1965  E. M. GILBERT  3,197,691
REGULATED POWER SUPPLY
Filed Jan. 2, 1962  3 Sheets-Sheet 1
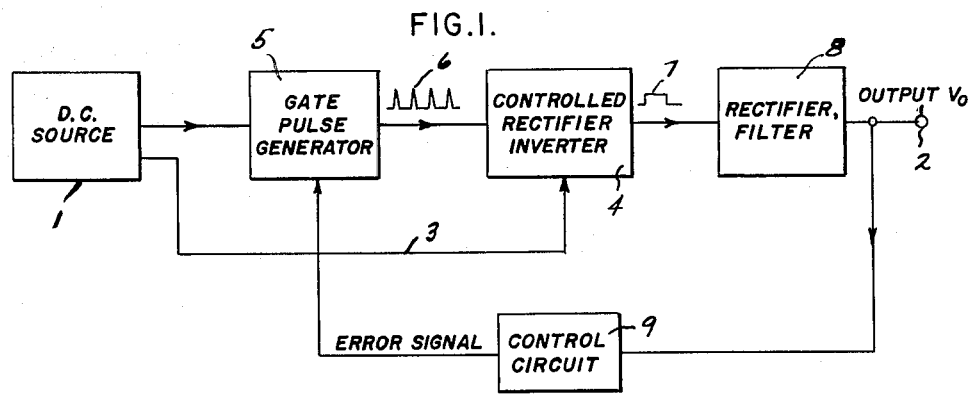
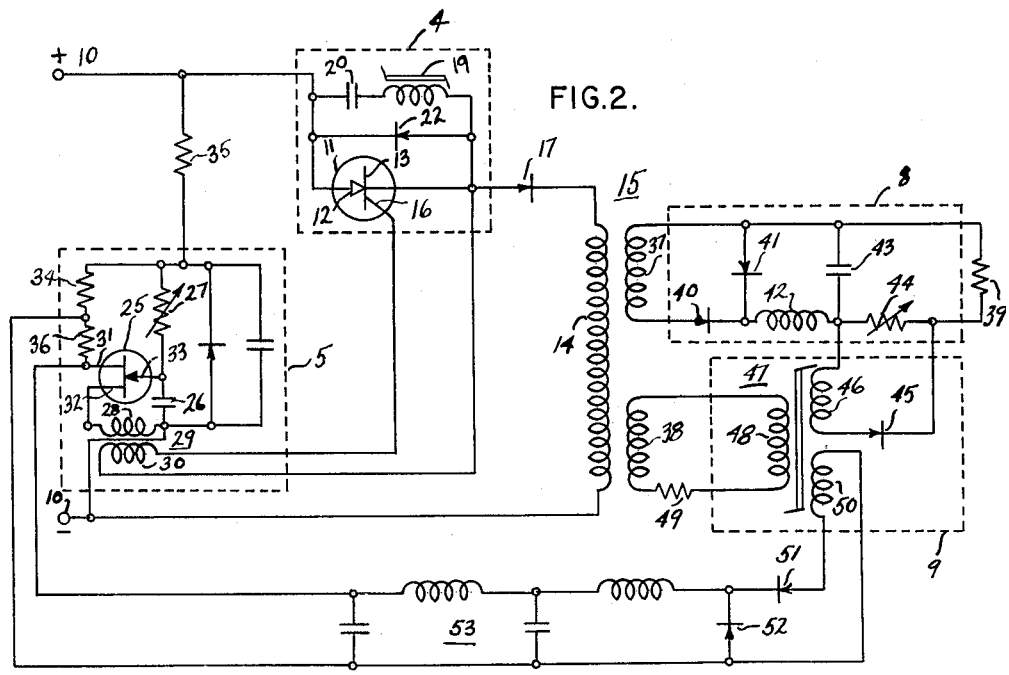
INVENTOR:
ELLIOTT M. GILBERT,
BY J. David Blumenfeld
HIS ATTORNEY.

July 27, 1965   E. M. GILBERT   3,197,691
REGULATED POWER SUPPLY
Filed Jan. 2, 1962   3 Sheets-Sheet 2
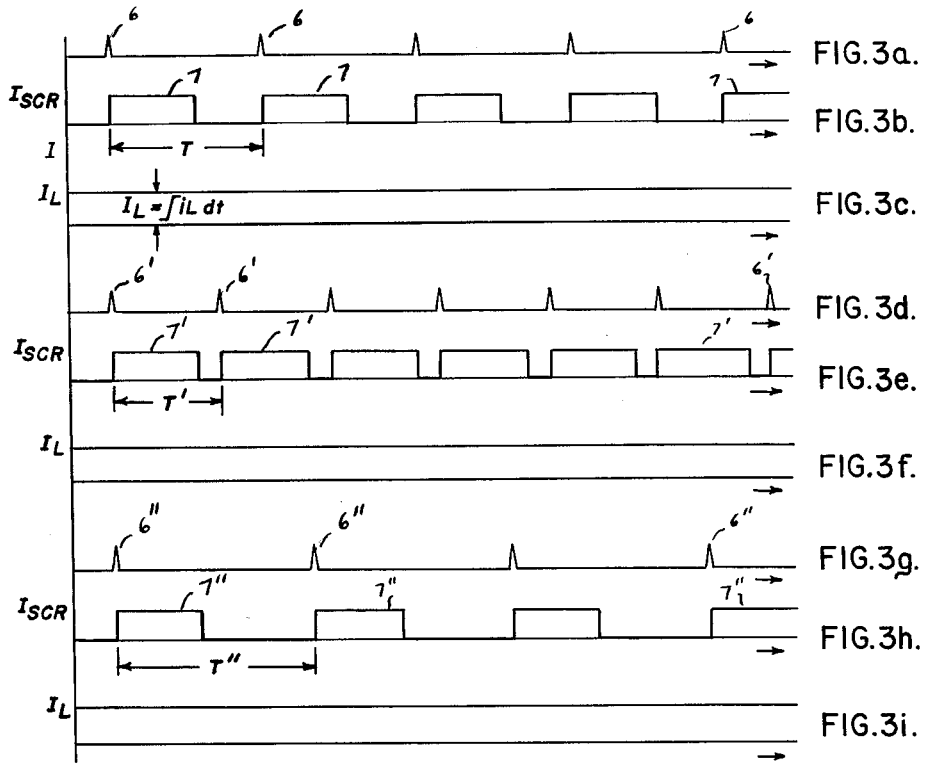
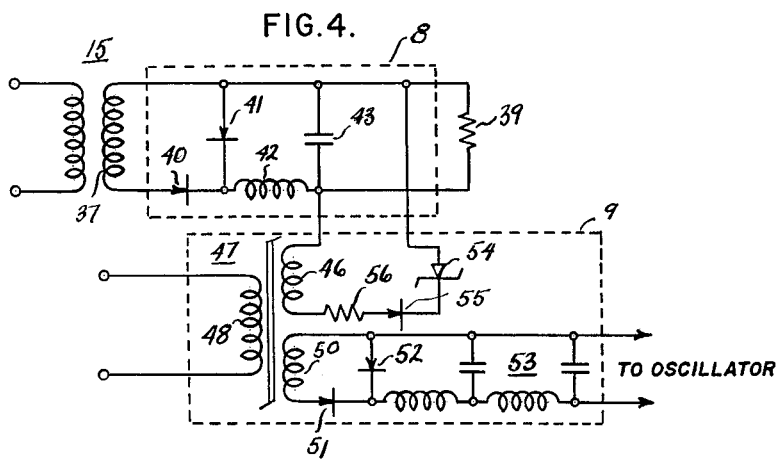
INVENTOR:
ELLIOTT M. GILBERT,
BY D. David Blumenfeld
HIS ATTORNEY.

July 27, 1965  E. M. GILBERT  3,197,691
REGULATED POWER SUPPLY
Filed Jan. 2, 1962  3 Sheets-Sheet 3

INVENTOR:
ELLIOTT M. GILBERT,
BY J. David Blumenfeld
HIS ATTORNEY.

United States Patent Office 3,197,691
Patented July 27, 1965

3,197,691
REGULATED POWER SUPPLY
Elliott M. Gilbert, Lynchburg, Va., assignor to General
Electric Company, a corporation of New York
Filed Jan. 2, 1962, Ser. No. 163,449
5 Claims. (Cl. 321—18)

This invention relates to a regulated power supply and more particularly to a regulated D.C. to A.C. converter silicon controlled rectifier devices.

Power supplies utilizing solid state devices such as transistors are well known in the art and have many useful applications. Typically such power supplies include transistorized D.C. to A.C. square wave oscillator inverters operating from a unidirectional input. These transistor oscillators include a pair of transistors and a saturable reactor. The transistors function essentially as switching elements with their switching time being controlled by the saturable reactor. D.C. to A.C. inverters of this type are well known and one such inverter is disclosed and described in Patent No. 2,783,384, Bright et al., issued February 26, 1957.

Transistorized inverters are perfectly satisfactory as long as the supply voltage from which they operate is fairly low, in the order of 6–12 volts or so. If the supply voltage is in the order of 50–100 volts or more, however, a much more severe problem is present. In fact, transistorized inverters are then comparatively unreliable or prohibitively expensive. That is, commercially available germanium transistors cannot be utilized since the maximum rated collector-emitter operating voltage $V_{CE}$ of the transistor is in this range. As a result, the transistors are exposed to overvoltages and are subject to damage or destruction, if used to invert voltages in this range. Although silicon power transistors are available which have maximum rated collector-emitting operating voltages of several hundred volts, these transistors are so expensive as to make their commercial use in power supplies prohibitive. Consequently, the need exists for a solid state power supply which is capable of operating from high unidirectional input voltages.

In addition, germanium transistor switching devices are also quite sensitive to ambient temperature conditions, and their operation under widely varying ambient temperatures and particularly in high temperatures environments is quite erratic. A substantial need exists, therefore, for a solid state power supply which is not sensitive to high ambient temperatures. One solid state device which has been found to have all of the desirable characteristics to avoid these various limitations of transistors are a class of solid state devices known as silicon controlled rectifiers, usually abbreviated to the initials SCR.

Silicon controlled rectifiers are PNPN semiconductor devices consisting of three rectifying junctions having anode, cathode and gate electrodes. With reverse voltage impressed across the cathode-anode electrodes (i.e., the cathode is positive relative to the anode), the controlled rectifier blocks the flow of current. When a forward voltage is applied (i.e., the anode is positive relative to the cathode), the controlled rectifier also blocks the current flow up to a "break-over" voltage, which is generally referred to as $V_{BO}$. At this break-over voltage, the blocking resistance of the SCR decreases almost instantaneously to a very low value and current flow is then limited only by the external voltage and circuit impedance. At anode-cathode voltages of less than $V_{BO}$, the controlled rectifier can also be switched into the high conduction state by the application of a low level gate-cathode current. The silicon controlled rectifier (SCR) can therefore be considered as a solid state analog of a gaseous thyratron device.

As is the case with thyratron devices, the gate electrode of an SCR loses control of the device once conduction is initiated. The controlled rectifier can be "turned off" terminating the flow of current by reducing the flow of anode current to a value less than a "holding" value generally referred to as $I_H$. The latter can be accomplished by reducing the supply voltage to zero, as would be the case if an alternating (A.C.) supply voltage were impressed across the anode or cathode, by diverting the anode current around the controlled rectifier for a few microseconds required for the device to recover its nonconducting or blocking state, or by reversing the polarity of the supply voltage impressed across the anode-cathode circuit.

It is, therefore, an object of this invention to provide a solid state power supply device which utilizes silicon controlled rectifier elements which may be operated to invert a high amplitude unidirectional supply voltage and which is relatively insensitive to over-voltage transients;

Another object of the invention is to provide a solid state power supply which is capable of operating at relatively high ambient temperatures;

In addition to the already enumerated advantages of solid state power supplies utilizing silicon controlled rectifiers, further and additional advantages are achieved in that regulation of the output voltage is much more easily achieved with power supplies of this type. That is, regulation of the output voltage to compensate for changes in load conditions may be effectively and easily achieved by controlling the conducting to nonconducting time ratio of the rectifier.

It is, therefore, a further object of this invention to provide a new and novel regulated voltage supply utilizing silicon controlled rectifiers as the solid state switching elements.

Other objects and advantages of the instant invention will become apparent as the description thereof proceeds.

In one form of the instant invention, a regulated power supply circuit is provided which utilizes silicon controlled rectifier circuits wherein the conducting to nonconducting time ratio of the SCR is controlled to regulate the output voltage. The SCR circuits are of the "self-commutating" type wherein the rectifier is turned off a fixed period of time after initiation of conduction by a quenching voltage generated in the circut. The rate at which the silicon controlled rectifier is triggered into the conducting state is varied in response to changes in load conditions. To this end, the output voltage is sampled and applied to a control circuit incorporating a saturable magnetic device. The saturable magnetic device produces an output error signal that is impressed on a pulse generator to control the repetition rate of the gating pulses applied to the controlled rectifier. This feedback loop thus continuously samples the conditions at the output terminals of the power supply and feeds back a correcting signal to maintain the output voltage at the proper level.

Other objects, features and many of the attendant advantages of this invention will be appreciated more readily by reference to the following detailed description, when considered in connection with the accompanying drawings, wherein like parts in each of the several figures are identified by the same reference character, and wherein:

FIG. 1 is a block diagram of a regulated power supply;

FIG. 2 is a schematic circuit diagram of a regulated solid state power supply utilizing controlled rectifier switching elements;

FIGS. 3a–3i are wave form diagrams useful in understanding the operation of the power supply of FIG. 2;

FIG. 4 is a schematic circuit diagram of a portion of the power supply of FIG. 2 illustrating an alternative method for sampling the conditions at the output of the power supply.

Figure 5:
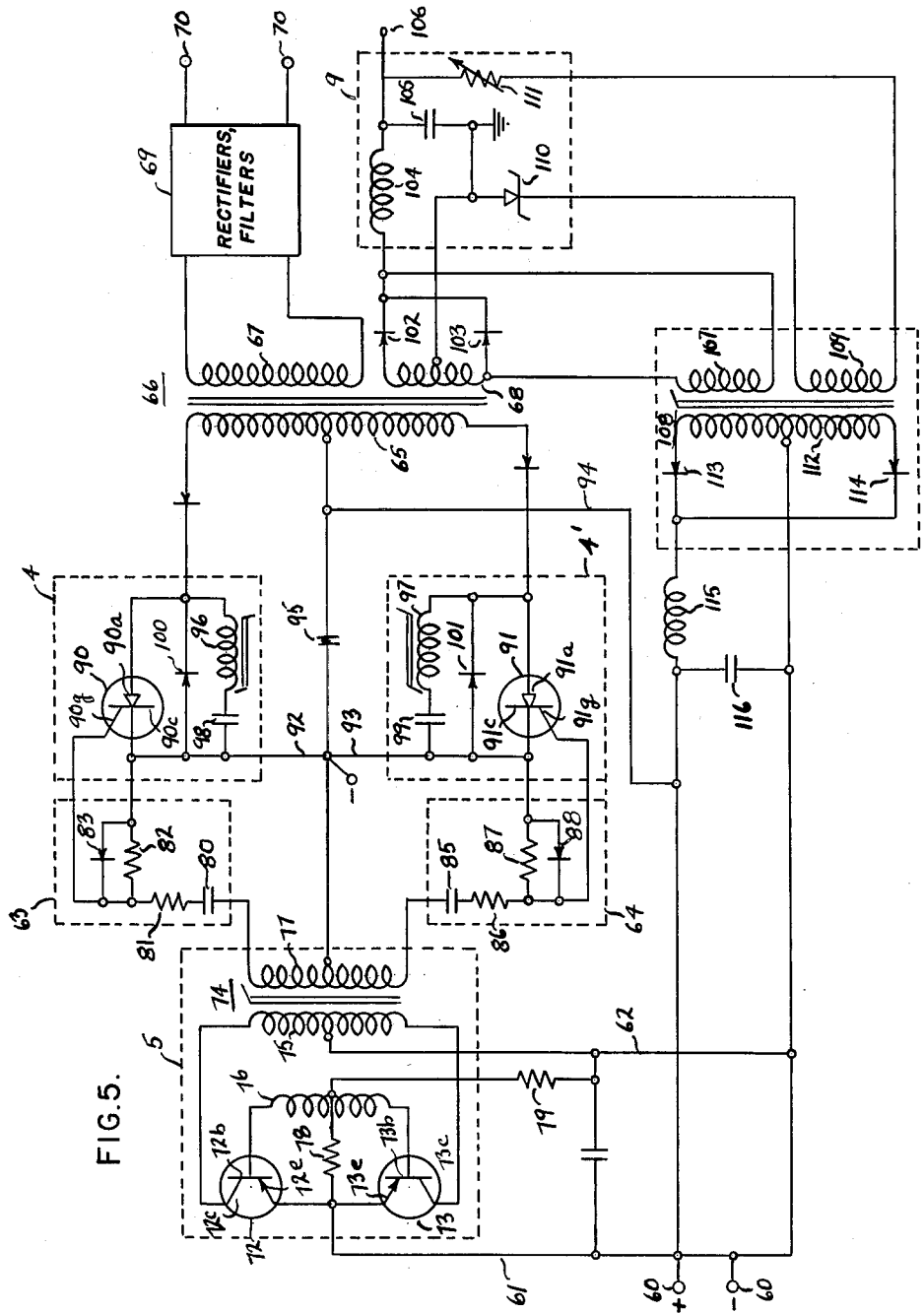
FIG. 5 is a circuit diagram of an alternative power supply circuit utilizing a pair of silicon controlled rectifiers in the parallel inverter circuit connection.

FIG. 1 illustrates, in block diagram form, a power supply which includes a silicon controlled rectifier D.C. to A.C. inverter, a rectifier circuit to convert the A.C. back to D.C., a feedback loop to control the inverter and regulate the output voltage. The main purpose for such a power supply is to convert a D.C. voltage of 80–100 volts from source 1 to a D.C. voltage of a different level at output terminal 2, which output voltage may be used, for example, as the operating voltages for radio equipment or the like. Supply voltage from D.C. source 1 is connected by means of a lead 3 to an inverter circuit 4 to provide the cathode to anode operating voltage of a silicon controlled rectifier. This voltage is less than the SCR "break-over" voltage $V_{BO}$ and in the absence of a gating or triggering pulse the controlled rectifier remains in its blocking or nonconducting condition.

The supply voltage is also impressed on gate pulse generator 5 which produces gating pulses 6 which periodically trigger rectifier inverter 4 into conduction. The output of the inverter is a square wave pulse 7 of a duration inversely proportional to the supply voltage but sufficiently so to cause complete compensation of input voltage changes, the repetition rate of which is a function of the repetition rate of the triggering pulses from gate pulse generator 5. The repetition rate of inverter output pulses 7, i.e., the time ratio of rectifier conduction and nonconduction, determines the magnitude of the output voltage at terminal 2. As the voltage at terminal 2 fluctuates with changes in load conditions the time ratio of the rectifier must be correspondingly varied to maintain the output voltage substantially constant in spite of the changes in load condition. The time ratio control is achieved by varying the repetition rate of the gating pulses from gate pulse generator 5. A feedback loop is provided which feeds back a correcting signal, or error signal, proportional to changes of the output voltage. The error signal is then applied to the gate pulse generator to vary the pulse repetition rate. A control circuit 9 including a saturable reactance device is coupled to output terminal 2 to produce the error signal in response to voltage variations at the output terminal. Inverter circuit 4 is thus continually controlled in response to changes in load conditions to maintain the output voltage substantially constant.

FIG. 2 is a circuit diagram of a regulated power supply of the type shown in block diagram form in FIG. 1. Supply voltage from a D.C. source, not shown, is impressed across input terminals 10—10 with the indicated polarity. The supply voltage at terminals 10—10 provides operating potential for the silicon controlled rectifier 11 forming part of inverter circuit 4. Positive terminal 10 is connected directly to anode 12 of the SCR and the negative terminal is connected to cathode 13 through primary winding 14 of output transformer 15 and a diode 17. SCR 11 also includes a gating electrode 16 which is coupled to a gate pulse generator shown generally at 5, presently to be described, which produces the pulses for periodically firing rectifier 11. SCR 11 is of the self-commutating or "quenching" type in that conduction is automatically terminated a fixed period of time after its initiation by application of a quenching or reverse biasing voltage. To this end, a quenching circuit is connected in shunt with the SCR which consists of the series combination of a saturable reactor element 19 and a capacitive storage element 20. The conduction period and hence the width of the current pulse supplied to the load is more or less fixed by the time necessary for the core of saturable reactor 19 to saturate. After the core of reactor 19 saturates it applies a reverse biasing voltage to which capacitor 20 has charged across the anode-cathode path of the rectifier thereby terminating conduction and returning the rectifier to its blocking condition.

A diode 22 is also connected in shunt with the SCR to limit the voltage drop across the rectifier and to provide a discharge path for capacitor 20 during commutation or "quenching" of the SCR.

The self-commutating or "quenching" silicon controlled rectifier circuit as such forms no part of the instant invention and is, in fact, described and claimed in patent application Serial No. 833,292, entitled "Magnetic Silicon Controlled Rectifier Power Amplifier," filed August 12, 1959, in the name of Raymond E. Morgan, now Patent No. 3,019,355 issued January 30, 1962 and assigned to the General Electric Company, assignee of the present invention. Suffice it to say that saturable reactance device 19 acts as a switch for applying a quenching potential to controlled rectifier 11 a fixed period of time after conduction starts. For further details and a description of this circuit, reference is also made to the General Electric publication entitled Controlled Rectifier Manual, published by the Semiconductor Products Department of the General Electric Company (1960), and particularly pp. 119–126 thereof in which this circuit is described and analyzed.

Gating pulse generator 5 is a solid state pulse generator comprising a uni-junction transistor switch 25, a storage capacitor 26 and a variable resistance 27 which forms the charging path for capacitor 26. Capacitor 26 is charged up through the variable resistance 27 and is periodically discharged by uni-junction transistor 25. The periodic discharge of capacitor 26 and the conduction of the uni-junction device periodically produces a short interval of current flow through the primary winding 28 of a pulse transformer 29 and a corresponding pulse in secondary winding 30 connected across the cathode-gate path of SCR 11. Uni-junction transistor 25 is a solid state semiconducting device which is formed of a bar of N-type silicon having two ohmic contacts at opposite ends which constitute base electrodes 31 and 32. A single rectifying contact, shown as emitter electrode 33, is made on the opposite side of the bar adjacent to base electrode 31. An inter-base resistance of several thousand ohms normally exists between bases 31 and 32. Base 32 is connected to the negative supply terminal 10 and base 31 to the positive supply terminal through dropping resistances 36, 34 and 35, thereby establishing an inter-base voltage $V_{BB}$ of a predetermined value. With no emitter current flowing, the silicon bar acts like a simple voltage divider and a certain fraction, $\eta V_{BB}$, of the voltage across the bar appears at emitter 33. If the external voltage applied to the emitter is less than $\eta V_{BB}$, which is usually termed the intrinsic stand-off ratio, the emitter is reverse biased and only a small emitter leakage current flows. If the external voltage applied to the emitter exceeds the intrinsic stand-off ratio, the emitter is forward biased and emitter current flows. This current consists primarily of holes injected into the silicon bar which holes move from emitter 33 to base 32 and result in an increase in the number of electrons in the emitter-base region. The net result is a decrease in the resistance between emitter 33 and base 32 so that as emitter current increases, the emitter voltage decreases and the negative resistance characteristic is obtained.

In operation, emitter 33 is initially reverse biased and no current flows from emitter 33 to base electrode 32. The emitter-base impedance in shunt with capacitor 26 is very high and the capacitor starts charging through variable resistance 27 and the load resistance 35 to the positive voltage on upper terminal 10. The rate at which capacitor 26 charges, and hence the repetition frequency of the saw-tooth and the repetition frequency of the gate pulses are initially established by variable resistance 27. As capacitor 26 charges up towards the value of positive voltage at terminal 10, it eventually reaches a value which is equal to or greater than the intrinsic stand-off ratio times the inter-base voltage $V_{BB}$. Emitter 33 is thus forward biased by the voltage on capacitor 26 and emitter current flows. The emitter-base resistance drops and the transistor 25 operates in the negative resistance region thereby rapidly discharging capacitance 26. The emitter-base current flows through transformer primary winding 28 connected between base 32 and the negative supply terminal 10 to generate a short pulse in secondary winding 30. The pulse is applied to gate electrode 12 of SCR 11 triggering it into conduction.

The repetition rate of the pulses produced by generator 5 may be varied by varying the intrinsic stand-off ratio of the uni-junction transistor. By varying the inter-base voltage across base electrodes 31 and 32, the intrinsic stand-off ratio is correspondingly varied. The level to which capacitance 26 must be charged to forward bias emitter 34 changes correspondingly and since the charging rate of capacitor 26 is established by resistor 27 is constant, the repetition rate of the pulses changes. For example, by increasing the interbase voltage, the stand-off voltage of the uni-junction transistor is increased, since the silicon bar acts like a simple voltage divider to establish the stand-off voltage at the emitter. Increasing the stand-off voltage increases the time required before the voltage across capacitor 26 forward biases the emitter. This, of course, decreases the repetition rate of the gate pulses. Similarly, by reducing the interbase voltage the stand-off voltage is decreased, and the repetition rate of the gate pulses increased. The repetition rate of pulse generator 5 is controlled by a D.C. error signal from a feedback control loop, presently to be described. The error signal is applied across voltage dropping resistor 36 connected in series with base electrode 31 and varies the applied interbase voltage established by the voltage dividing network consisting of resistors 36, 34 and 35.

The pulse rate of the pulses from gate pulse generator 5 is varied as a function of the conditions at the output terminal 2 of the power supply. The square wave current pulse from controlled rectifier inverter 4 is applied through diode 17 to the primary winding of output transformer 15 which has two secondary windings 37 and 38. Winding 37 is coupled to rectifier-filter circuit 8 to produce a D.C. output voltage $V_0$ which is applied to a suitable load, indicated for simplicity of illustration as a resistor 39. Rectifier-filter circuit 8 includes a half-wave rectifier arrangement consisting of a series connected diode 40 poled to conduct during positive alternations and a shunt diode 41 poled to bypass negative excursions of the signal. An L-C filter section comprising a series inductance 42 and a shunt capacitance 43 is coupled between the half-wave rectifier and load 39. Shunt capacitor 43 not only bypasses any alternating current component but also acts as an energy storage element which is charged to a level $V_0$ by the rectified input.

A sampling means is provided at the output of the power supply to sense changes in $V_0$ due to changes in load conditions or any other parameter which is likely to cause a change in the output voltage. In the circuit arrangement illustrated in FIG. 2, changes in load current are utilized to sense any changes in load conditions which may result in changes in the output from the power supply. To this end, a variable resistor 44 is connected in series with the load between the junction of inductance 42 and capacitance 43 and one terminal of load element 39. The voltage drop across resistor 44 is therefore a function of the load current through load 39 and is applied to control circuit 9 to produce a unidirectional error voltage representative of changes at the output. Connected across resistor 44 is the series combination of a diode 45 and the control winding 46 of a saturable transformer 47. The voltage drop across resistor 44 produces a variable control current for winding 46 and controls the saturable device. Saturable transformer 47 includes an input or power winding 48 which is coupled through a current limiting resistance 49 to winding 38 of output transformer 15. Input or power winding 48 therefore supplies the A.C. power to the saturable transformer 47 which appears at output winding 50 of the transformer.

The core of saturable transformer 47 is formed of a magnetic material having a substantially rectangular hysteresis loop. Such materials have a sharp transistion point between conditions of saturation and nonsaturation so that the impedances of the windings change almost instantaneously from a high value to substantially zero. Under normal conditions the energizing voltage impressed on winding 48 appears by transformer action across output winding 50. The amount of energy transferred to output winding 50 and hence the magnitude of the output voltage is a function of the fraction of the energizing voltage cycle that the transformer remains in the unsaturated condition. The time required for saturation of the core of the transformer is proportional to the voltage time integral $\int edt$ of the applied voltage and this in turn is proportional to both the input to winding 48 and the control current in control winding 46. Thus, the voltage drop across resistor 44 which is representative of the load current produces a control current in winding 46 that establishes a control flux in the transformer core. This flux may add to or oppose the flux due to the energizing voltage at input winding 48. Hence, the length of time before transformer 47 saturates depends of the control current in winding 46. If the flux due to control winding 46 increases, transformer 47 saturates earlier in the cycle and conversely if the flux due to control winding decreases, the transformer saturates later in the cycle.

The output voltage across winding 50 is applied to a half-wave rectifying circuit to produce the correction voltage for controlling pulse generator 5. The half-wave rectifier circuit includes a series connected diode 51 and a shunt connected diode 53. Diode 51 is poled to conduct during positive alternations of the output and diode 53 conducts during negative alternations or transients to bypass negative alternations. The rectified output voltage is applied to an L-C Pi network 53 which filters out any remaining alternating current components.

The unidirectional correction voltage is applied across resistor 36 connected in series with base 31 of uni-junction transistor 25 and selectively increases or decreases the interbase voltage to vary the pulse repetition rate of generator 5. Changes in the pulse rate from generator 5 controls the conduction to nonconduction time ratio of controlled rectifier inverter circuit 4 thereby varying the average output current supplied to the load and hence the output voltage at the load terminals.

The manner in which the regulated solid state power supply of FIG. 2 functions may be most readily understood by reference to FIGS. 3a–3i which represent wave forms in various parts of the circuit. Initially, pulse generator 5 is adjusted, by varying resistor 27, to have a predetermined pulse repetition rate as represented by the pulses 6 in FIG. 3a. This pulse repetition rate is such that the conducting to nonconducting time ratio of the rectifier is represented by the ratio of the period $t$ current pulses 7 of FIG. 3b to the total period T. This ratio is such as to produce the desired output voltage $V_0$ and the average current delivered by the rectifier is current, $I_L \cdot I_L$ produces a voltage drop across resistor 44 and a corresponding control current which causes transformer 4 to saturate at a time such that the rectified error signal applied to the pulse generator maintains the desired pulse rate.

If load conditions now change so as to increase the load current, a condition which usually produces a drop in the output voltage $V_0$, the voltage drop across resistor 44 increases. The magnitude of the control current in winding 46 of saturable transformer 47 therefore increases as does the control flux produced thereby. Since the control flux opposes the flux produced by the input winding 48 transformer 48 saturates later in the cycle increasing the output voltage and the magnitude of the unidirectional correction voltage applied across series resistance 33.

Since the correction voltage applied across resistance 33 opposes the supply voltage to base 31 from positive terminal 10, the interbase voltage of uni-junction transistor 25 is decreased. This reduces the stand-off voltage. Since capacitor 26 is being charged at a constant rate through resistances 27 and 35 from the positive voltage source, it is obvious that the voltage across capacitor 26 is necessary to drive uni-junction transistor 25 into the conducting stage, is decreased thereby increasing the repetition rate of the saw-tooth wave and of the gating pulses. These gating pulses 6', as shown in FIG. 3d, occur closer together reducing the nonconducting period of controlled rectifier 11 as shown in FIG. 3e. As a result, the time ratio of $t/T$ is increased and the average current delivered by the SCR is correspondingly increased, as illustrated in FIG. 3f, to return the output voltage $V_0$ to the desired value.

In the event that the load current decreases, indicating a rise in the output voltage $V_0$, the voltage drop across resistor 44 also decreases, reducing the control current in control winding 46 of saturable transformer 47. The opposing control flux due to winding 46 is reduced and transformer 47 saturates earlier in the cycle of the applied energizing voltage. The output voltage and the rectified correction voltage applied to gate generator 5 also decrease. Reduction of the correction voltage increases the interbase voltage of uni-junction transistor 25 and correspondingly raises its stand-off voltage. Since the stand-off voltage has now been increased, capacitor 26 must charge to a higher voltage before emitter-electrode 33 is forward biased to discharge the capacitor. It is therefore obvious, as illustrated in FIG. 3g, that the repetition rate of the output pulses applied to controlled rectifier inverter 4 is decreased. The decrease of the repetition frequency of gating pulses 6'' increases the nonconducting time of the controlled rectifier, as shown in FIG. 3h, and the ratio $t/T''$ is decreased, reducing the average current delivered by the rectifier. The reduction of the average current, shown in FIG. 3i, decreases the output voltage $V_0$ to the desired value.

In the regulated voltage supply of FIG. 2, the load current was sampled as an indication of changes in load conditions and used to control the saturable transformer. It will be obvious, however, that changes in the load voltage may be measured directly in order to regulate the output. FIG. 4 shows a voltage sampling circuit which may be used with the power supply circuit of FIG 2. Rectifier-filter 8 rectifies the square wave signal from an inverter circuit, not shown. The square wave is impressed across secondary winding 37 of output transformer 15 and is applied to a half-wave rectifier comprising the series connected diode 40 and the shunt connected diode 41. As pointed out previously in connection with FIG. 2, diode 40 is poled to conduct during positive alternations whereas shunt diode 41 is poled to bypass negative alternations or transient negative pulses from the load circuit. An L-C filter circuit comprising the series connected inductance 42 and a shunting capacitance 43 is coupled between the rectifiers and a load 39. Connected directly across the output terminals and across load 39 is an output voltage sampling circuit which controls saturable transformer 47 which forms part of control circuit 9. The sampling circuit comprises a voltage reference such as the Zener diode element 54 connected in series with a diode 55 and a current limiting resistor 56. Zener diodes 54, diode 55 and dropping resistance 56 are connected to control winding 46 of saturable transformer 47 and in shunt with the load terminals to apply a control current to winding 46 which varies in accordance with variations in the output voltage. Control winding 46, in a manner similar to that described previously with reference to the circuit of FIG. 2, operates to control the saturation point of the transformer. This control of the saturation point of transformer 47 controls the output at winding 50 and the voltage impressed on half-wave rectifier diodes 51 and 52. The unidirectional output voltage from the half-wave rectifier is applied to an L-C Pi filter and to gate pulse generator 1, not shown. The circuitry illustrated in FIG. 4 functions in exactly the same way as the circuit of FIG. 2 to vary the repetition frequency of the gate pulse generators and thereby the conducting to nonconducting time ratio of the silicon controlled rectifier inverter.

FIG. 5 illustrates an alternative embodiment of a regulated power supply which utilizes alternately conducting parallel inverters. The unidirectional voltage which is to be converted to a different level is applied to input terminals 60—60 with the indicated polarity. This unidirectional voltage is applied over leads 61 and 62 to a variable frequency gate pulse generator 5 which produces square wave gating signals which are applied respectively to SCR inverter circuits 4 and 4' through a pair of differentiating circuits 63 and 64. Differentiating circuits 63 and 64 differentiate the square waves from gate pulse generator 5 to produce triggering pulses of short duration for silicon rectifier inverters 4 and 4'. The silicon controlled rectifiers 4 and 4' conduct alternately to produce alternate current flow through the two halves of center tapped winding 65 of output transformer 66. Output transformer 66 has a two secondary winding 67 and 68 which are respectively connected to a suitable rectifier and filter arrangement 69 to produce a unidirectional output voltage at the output terminals 70—70. A control circuit 9 produces a unidirectional voltage which is fed back to and controls the repetition rate of gate pulse generator 5. Generally speaking, the regulated circuit of FIG. 5 is very similar in nature and operation to the regulated power supply of FIG. 2, the only difference being the use of parallel inverters which operate alternately and which produce a square wave output having alternations of opposite polarity.

Pulse gate generator 5 consists essentially of a solid state transistorized square wave oscillator which supplies a square wave gating signal to differentiating circuits 63 and 64 to provide the gating signals for the controlled rectifier inverters. Gate generator 5 comprises first and second transistors 72 and 73, each having a base electrode 72b and 73b, an emitter electrode 72e and 73e and a collector electrode 72c and 73c. Transistors 72 and 73 are connected in a self-oscillating circuit to produce the desired square wave output through a saturable three winding transformer element 75 comprising a center tapped primary winding 76, a center tapped output winding 77 and a center tapped feedback winding 78. Bases 72b and 73b are connected together through feedback winding 78 whereas emitter 72e and 73e are connected directly together and to the positive terminal of the supply voltage to lead 61.

Forward biasing for the transistors to insure rapid and effective starts is provided by the voltage divider comprising the resistances 78 and 79 connected in series between the positive and negative supply voltage terminals. The collectors 72c and 73c are connected to the negative supply terminals 60 through primary winding 76 and lead 62 connected thereto. Transistors 72 and 73 are alternately switched into the conducting state and remain in the conducting state for a period of time determined by the time necessary for the saturable transformer 75 to saturate. The period of time necessary for the transformer to saturate is a function again of the voltage time integral $\int edt$ of the applied voltage to the transformer and hence the saturation time and the operating frequency of gate oscillator 5 is a function of the magnitude of the applied unidirectional supply voltage.

The output winding 77 of saturable transformer 75 is center tapped and hence the square waves generated by the transistor oscillator are alternately applied in polarity opposition to the differentiating circuits. As a result during one alternation of the square wave a positive pulse appears across the upper half of winding 77 whereas a negative pulse appears simultaneously across the lower half. During the other alternation of the square wave output, a negative square wave appears across the upper half of winding 77 and a positive pulse across the lower winding. These waves are differentiated in differentiating circuits 63 and 64 to produce the short triggering pulses for the controlled rectifier inverters.

Differentiating circuit 63 comprises a capacitor 80 and a current limiting resistor 81 connected in series between the upper end of winding 77 and the gating electrode of the controlled rectifier of inverter 4. A parallel differentiating resistance 82 is connected between the cathode of the controlled rectifier and the junction of current limiting resistance 81 and the gate electrode. The combination of capacitor 80 and resistor 82 differentiates the pulse fronts on the square wave to produce respectively a positive and a negative going spike for each alternation of the square wave.

A voltage limiting diode 83 is connected in shunt with differentiating resistance 82 and functions to limit the magnitude of the reverse gate voltage to a value equal to the forward drop of these diodes. That is, the diode is so poled that during the negative triggering pulses, diode 83 becomes conducting thereby shunting these negative pulses around differentiating resistance 82 and limiting the reverse biasing voltage to the voltage drop across the diode.

Differentiating circuit 64 similarly comprises a differentiating capacitor 85, a current limiting resistance 86 connected in series between the lower end of winding 77, and the gate electrode of the controlled rectifier of inverter circuit 4'. A differentiating resistance 87 is connected between the cathode of the controlled rectifier and the junction of resistance 86 and the gate electrode. A current limiting shunting diode 88 is connected in shunt with differentiating resistance 87 in order to bypass the negative spikes produced by the differentiating circuit and to limit the reverse voltage to the voltage drop across the diode.

During square wave alternations of one polarity, the upper end of winding 77 may, for example, be positive with respect to the center tapped reference point while the lower end is negative with respect to the same point. The square wave voltage is differentiated by differentiating circuit 63 to produce a short positive going pulse which is applied across the gate-cathode of a controlled rectifier to initiate conduction in a rectifier inverter circuit 4. Since the lower end of winding 77 is negative with respect to the reference point differentiating circuit 64 to produce a short negative pulse. This negative triggering pulse is, of course, the wrong polarity to initiate conduction in the controlled rectifier of inverter 4' and inverter 4' remains in the blocked condition. A fixed period of time later, a period which is less than one half of the gating square wave period, inverter 4 ceases to conduct. During the next half alternation of the square wave pulse from gate generator 5 the reverse sequence takes place to trigger inverter 4'. That is, the lower end of winding 77 is positive and the upper end negative with respect to the reference point and the differentiated output from circuit 63 is a negative pulse which is of the wrong polarity to initiate conduction of inverter 4. The output of differentiator 64, however, is a positive triggering pulse which is applied to the gate-cathode path of the controlled rectifier of inverter 4' thereby initiating conduction. It may be seen therefore that the inverters 4 and 4' are alternately brought to the conducting state to drive current through the respective upper and lower halves of the primary winding 65. The current flowing alternately through the upper and lower halves of winding 65 produces an alternating square wave voltage at the secondary windings of output transformer 66.

Inverter circuits 4 and 4' respectively include silicon controlled rectifiers 80 and 81, each of which has an anode 80a and 81a, a cathode 80c and 81c, and gate electrodes 80g and 81g. Operating voltage for each of the controlled rectifiers 80 and 81 is provided by connecting the cathodes 80c and 81c to a negative terminal 60 by means of suitable leads 82 and 83. Similarly, positive potential from positive input terminals 60 is provided by means of lead 83 connected to a center tap on winding 65 of output transformer 66. Capacitance 84 is connected between the center tap of winding 65 and the negative terminal 60 to block A.C. from the D.C. source. Each of the silicon controlled rectifiers 80 and 81 is of the self-commutating or "quenching" type discussed in detail in connection with the circuit arrangement of FIG. 2. That is, the conduction of each of the controlled rectifiers is automatically terminated a fixed period of time after its initiation by the application of quenching or reverse biasing voltage across the anode-cathode path. To this end, each of the controlled rectifiers includes a quenching or self-commutating circuit connected in shunt with the anode-cathode path of the rectifier circuit which consists of a saturable reactor element 85 and 86 connected in series with a capacitive storage element 87 and 88. The conduction period of the silicon controlled rectifiers 80 and 81 and hence the width of the current pulse supplied to the output winding and to the load is more or less fixed by the time necessary for the core of the individual saturable reactors to reach the saturation stage. After the core saturates a reverse biasing voltage is applied from capacitors 87 and 88 respectively across the anode-cathode path of the rectifier thereby terminating or "quenching" conduction and returning the individual rectifiers to its blocked condition. Blocking diodes 89 and 90 are also connected in shunt with the controlled rectifier to limit the voltage drop across the controlled rectifier and to provide a discharge path for the storage capacitors during commutation or "quenching."

The feedback loop for controlling the conduction to nonconduction time ratio of the individual rectifier inverters 4 and 4' is coupled to the output of the inverters for sampling the output voltage variations in response to changes in load condition. The output appearing across secondary winding 68 is applied to a full-wave rectifier comprising the diode elements 92 and 93 connected to output terminals of the winding. Diodes 92 and 93 are poled in the forward direction of current flow and in a well known manner rectified both alternations of the supply voltage to produce a unidirectional output voltage proportional to the magnitude of the conduction to nonconduction time ratio. A filter section comprising a series connected inductance 94 and a shunting capacitance 95 is coupled to the output of the full-wave rectifier and produces a filter unidirectional voltage at a terminal 96. The alternating signal output appearing across the center tapped secondary winding 68 is coupled to an input winding 97 of a saturable transformer 98 forming part of the control circuit 9.

A portion of the rectified output voltage appearing across output terminal 96 is sampled to produce a control current in the control winding 98 of saturable transformer 99 to control the saturation of the transformer and hence the magnitude of the error signal. The sampling means consists of a voltage reference source such as a Zener diode 100, a variable limiting resistance 101 connected across output terminals and in series with control winding 99. In a manner similar to that described in connection with FIG. 4 the control current flowing through control winding 99 varies in response to variations of the output voltage appearing at terminals 96. This control is utilized to vary the control flux in the core material of saturable transformer 98 to control the point in the energizing voltage cycle at which the transformer saturates and hence the output voltage across the output winding 102 of the saturable transformer.

The output appearing across winding 102 is applied to a full-wave rectifying circuit comprising diodes 103 and 104, which are poled in the forward direction of current flow to rectify the output alternations to produce a unidirectional correction voltage proportional to the magnitude and variations of the output voltage at terminal 96. The rectified voltage is filtered in an L-C network comprising series connected inductance 105 and a shunting capacitance 106. The filtered correction voltage is then applied through leads 61 and 62 to the transistorized square wave generator forming gate pulse generator 5. As was pointed out previously, the transistorized square wave generator is voltage sensitive in that the repetition frequency of its output is a function of the applied D.C. voltage and hence the voltage appearing at the output of control circuit 9 varies the repetition rate of the gating pulses applied to the individual differentiating circuits 63 and 64 and hence controls the conduction to nonconduction time ratio of inverters 4 and 4' to maintain the output voltages at terminals 69, 70 and 96 at the proper levels in spite of changes in load conditions which may have the tendency to vary the output voltage.

It will be apparent from the instant description that a number of embodiments of a novel regulated solid state power supply have been described which is simple, effective, and may be accurately regulated to maintain close control over the output voltage in spite of wide variations in load conditions.

While particular embodiments of this invention have been shown and described above, the invention is in no way limited thereto since many other modifications both in the circuit arrangement and in the instrumentalities employed may be made. It is contemplated by the appended claims to cover any such modifications which fall within the true spirit and scope of this invention.

What is claimed as new and desired to be secured by Letters Patent is:

1. In a regulated solid state power supply circuit the combination comprising,
   (a) D.C. to A.C. inverting means including self-commutating silicon controlled rectifier means for producing output pulses from a unidirectional input the duration of said output pulses being fixed,
   (b) gate pulse generating means for producing gate pulses having a variable repetition rate to trigger the controlled rectifier means periodically into conduction after the said silicon control rectifier means has become nonconducting due to its self-commutating action, the repetition rate of said pulses thereby controlling the nonconducting to conducting time ratio of said rectifier means,
   (c) means coupled to said inverter for rectifying said output pulses and producing a unidirectional output the magnitude of which is dependent on the conducting to nonconducting time ratio of said rectifier means,
   (d) means to control the conducting to nonconducting time ratio of said rectifier means in response to said output including,
      a control circuit responsive to said output signal for producing an error signal proportional to the deviation of said output from a predetermined level having a saturable reactance device to produce said signal, and,
      means to apply said signal to said pulse generating means to vary the repetition rate of said gate pulse to vary the conducting to nonconducting time ratio of said rectifier to maintain the unidirectional output constant.

2. The regulated power supply according to claim 1 wherein said saturable reactance device comprises a
   (a) saturable transformer having an input winding,
   (b) an output winding,
   (c) a control winding, and
   (d) means coupling said control winding to the output of said rectifying means to produce a control current proportional to said unidirectional output, the magnitude of said control current determining the saturation point of said transformer and the magnitude of the output from said output winding.

3. The regulated power supply according to claim 1 wherein said means to control the conducting to nonconducting time ratio of said rectified includes,
   (a) means to produce a control signal in response to the load current flowing at the output of said rectifying means, and
   (b) means to couple said control signal to said control circuit to produce said error signal.

4. The regulated power supply according to claim 1 wherein said means to control the conducting to nonconducting time ratio of said rectifier includes,
   (a) means to produce a control signal in response to the load voltage appearing at the output of said rectifying means, and
   (b) means to couple said control signal to sai dcontrol circuit to produce said error signal.

5. In a regulated solid state power supply circuit the combination comprising,
   (a) D.C. to A.C. converting means including first and second alternately conducting self-commutating silicon rectifier means for producing square wave output pulses, the duration of each alternation of the output pulses being substantially fixed,
   (b) gate pulse generating means having a variable repetition rate for producing square wave gate pulses,
   (c) differentiating means coupled between said gate generator and said first and second rectifiers to differentiate said square wave pulses and produce triggering pulses for alternately causing said rectifiers to become conducting,
   (d) rectifying means coupled to said inverter for producing a unidirectional output the magnitude of which is dependent on the conducting to non-conducting time ratio of said inverters,
   (e) means to control the conducting to nonconducting time ratio of said rectifiers in response to changes in said output including,
      means to sample said output and produce a control signal proportional to said output signals,
      a saturable transformer having an input winding energized from the square wave inverter output,
      a control winding,
      an output winding,
   (f) means coupling said control signal to said control winding to vary the saturation time and the magnitude of the error signal from said output winding of said transformer in response to output windings, and,
   (g) means coupling said error signal to said gate generator to vary the repetition rate of said gate pulses and thereby the conducting to nonconducting time ratio of said rectifiers.

References Cited by the Examiner
UNITED STATES PATENTS

| | | | |
|---|---|---|---|
| 2,783,384 | 2/57 | Bright et al. | 321—44 |
| 3,010,062 | 11/61 | Van Emden | 321—18 |
| 3,069,612 | 12/62 | Hamilton | 321—18 X |

LLOYD McCOLLUM, *Primary Examiner.*